Nov. 15, 1949     H. HEIMANN     2,487,802

RETAINING RING ASSEMBLY

Filed Nov. 8, 1944

Inventor
Heinrich Heimann,
By *[signature]*
Attorney

Patented Nov. 15, 1949

2,487,802

UNITED STATES PATENT OFFICE 2,487,802

RETAINING RING ASSEMBLY

Heinrich Heimann, New York, N. Y., assignor to Waldes Koh-I-Noor, Inc., Long Island City, N. Y., a corporation of New York Application November 8, 1944, Serial No. 562,548

4 Claims. (Cl. 85—8.5)

This invention relates to improvements in retaining ring assemblies for securing machine parts, for example gearing, bearing races, pulleys and the like against axial displacement on shafts or in housings, and to an improved spring retaining ring for use therewith.

As usually constructed, spring retaining rings are of two main types. The first or so-called ordinary type retaining ring has uniform section height and equal thickness throughout and is characterized by an inner diameter, in the case of an external ring, and an outer diameter in the case of an internal ring, which equals the diameter of the bottom of the shaft or housing groove into which such rings are conventionally sprung, thus to insure that the ring seats against the groove bottom. However, due to the fact that such rings deform ovally when spread or compressed and are, moreover, operative only in their own plane, it is inherent in their construction that they have turning fit against the groove bottom and hence do not exert any substantial pressure thereagainst or any axial or endwise pressure against the machine parts secured thereby. According to the second known type of spring retaining ring, the ring is tapered so that the section heights thereof decrease progressively from the ring mid section to the free ends thereof, the taper being calculated so that the ring maintains its circularity under deformation, i. e. when spread or compressed. Such rings can be dimensioned so that when sprung into their grooves they fit tight against the bottom of the groove with a remarkably high pressure, and hence they have a pressure fit against the groove bottom as distinguished from the turning fit characterizing the ordinary spring ring of uniform section height. However, the known tapered rings, like the so-called ordinary rings, are operative only in their own plane and hence are unable to exert any endwise force or thrust against the machine parts secured thereby.

Thus, both of the stated types of rings are objectionable for certain uses in that they are incapable of exactly locating a machine part relative to shaft or housing due to the necessary tolerances in the length of the machine part itself, in the thickness of the retaining rings themselves and, last but not least, in the location of the groove in the shaft or housing. On the other hand, both types of rings as heretofore constructed usually result in end play between the holding face of the ring and the corresponding abutting end face of the machine part to be held, which can amount to the sum total of the tolerances enumerated above.

A principal object of this invention is the provision of a retaining ring assembly of simple and dependable construction employing a spring retaining ring of progressively decreasing section height for locating a machine part axially relative to a shaft or housing carrying the same while at the same time resiliently securing the part against end play.

Another object of the invention is the provision of a retaining ring assembly capable of resiliently securing a machine part against axial end play relative to a shaft or housing carrying the same, while at the same time permitting the necessary tolerances in the dimensioning of the machine part, the thickness of the ring itself, and in the location of the shaft or housing groove.

A further object of the invention is the provision of a retaining ring assembly incorporating a retaining ring having pressure fit throughout its full circumference against the bottom of its groove and which is capable of exerting a substantial pressure in axial direction against the abutting end face of a machine part held by the seated ring.

A further object of the invention is the provision of a spring retaining ring characterized by diminishing section height from its mid section to the free ends thereof, which is also symmetrically bowed about a transverse line extending transversely of the ring substantially intermediate its middle section and the free or open ends thereof, and is thereby capable when properly positioned in its groove of exerting resilient pressure against an abutting machine part held thereby.

Other objects will be in part obvious and in part hereinafter pointed out in connection with the following analysis of this invention wherein are illustrated in detail several embodiments of the invention.

In the drawings—

Figure 1:
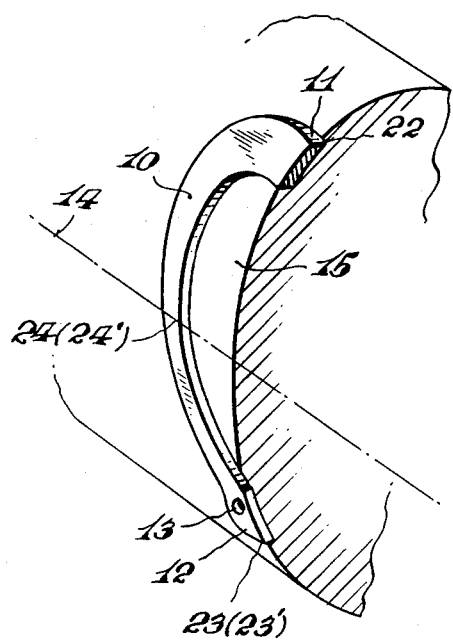
Fig. 1 is a perspective view of one-half of an external retaining ring according to the invention, taken along a section line extending through its vertical axis or center line.

Referring to the drawings, reference character 10 (Fig. 1) designates a so-called external retaining ring, shown in half vertical section, of the type adapted to be sprung into an outwardly opening shaft groove provided to receive the same. The illustrated ring comprises an open-ended spring steel ring, the section height of which progressively decreases from its upper or middle section 11 to the free ends thereof, which latter are provided with outwardly protruding lugs or ears 12 which are apertured as at 13 for the reception of the points of a handling tool. It will be understood that due to its taper, i. e. progressively decreasing section height, the ring as illustrated maintains its circularity under deformation.

According to the invention, the ring 10, rather than being a flat or plane ring as heretofore, is symmetrically bowed about a hypothetical line 14 which extends transversely of the ring substantially intermediate its middle section 11 and the free or open ends thereof. Preferably the ring is bowed to conform to the arc of a cylindrical surface 15 of predetermined or fixed radius, the radius of said surface thus determining the contour of the ring as the latter is viewed in side edge elevation and the degree of bowing thereof.

Figure 2:
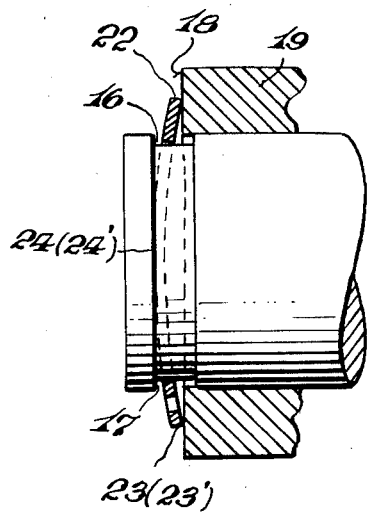
Fig. 2 is a longitudinal section through a typical retaining ring assembly incorporating the retaining ring as shown in Fig. 1.

As can be seen from Fig. 2, which illustrates a typical retaining ring assembly employing a bowed external ring according to the invention, the ring 10 when sprung into its shaft groove 16 retains the property of fitting with a remarkably high degree of pressure against the bottom of the groove throughout its full circumference. It will be moreover observed that due to the bowing of the ring any axial restraint imposed thereon as it is fitted into its groove causes the ring to exert resilient pressure in axial direction between the fixed outer wall 17 of the groove and the adjacent end face 18 of the machine part 19 adapted to be secured by the ring. More specifically, with a ring disposed as in Fig. 2, and with the machine part end face 18 overhanging the relatively inner wall 20 of the groove, the bowed ring 10 abuts both along an edge portion 22 of its upper periphery and at opposite points 23, 23' of its lugs or ears 12 against the abutting end face 18 of the machine part, whereas its horizontal middle sections 24 (24') abut against the outer fixed wall 17 of the shaft groove. Hence, with the ring being urged to plane form by reason of the restraint imposed on the opposite faces or sides thereof by the machine part and the fixed wall of the groove, the ring in tending to return to its bowed shape exerts endwise resilient pressure against the machine part thus to secure the part against end play.

According to a further feature of the invention, the effective width of the shaft groove 16 is somewhat larger than that provided for conventional flat rings, by an amount which equals the sum total of the maximum permissible tolerances of the machine part, of the ring thickness and of the location of the groove in the shaft. At the same time, the degree of bowing imparted to the ring, i. e. the distance between a plane tangent to the ring at spaced points 24, 24' on its horizontal center line, and a plane containing the points 22 and 23, 23' thereof at least equals and preferably exceeds by a small amount the sum total of these tolerances. Accordingly, to seat the ring in its groove, the ring is required to be sprung into the groove in such manner that it exerts a certain axial force on the machine part, thus to act simultaneously as a circular spring and as a leaf spring. Hence a ring according to the invention functions to resiliently hold the machine part against axial displacement and in such manner that no free end play thereof can occur.

Figure 3:
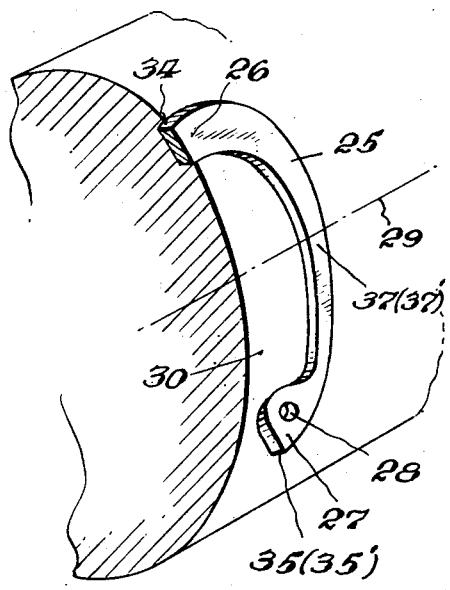
Fig. 3 is a perspective view of one-half of an internal retaining ring according to the invention.
Figure 4:
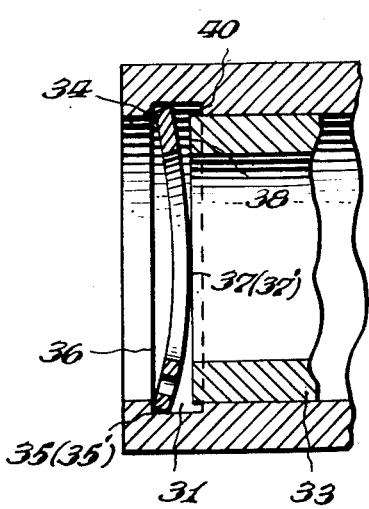
Fig. 4 is a longitudinal section through a typical retaining ring assembly incorporating the retaining ring as shown in Fig. 3.

According to the embodiment illustrated in Figs. 3 and 4, illustrating, respectively, a so-called internal ring and an internal retaining ring assembly according to the invention, the internal ring 25 tapers from its middle section 26 to inwardly extending ears 27, characterizing the internal ring, which latter are provided with apertures 28 to assist in ring handling. As with the ring illustrated in Fig. 1, the ring 25 is symmetrically bowed about a hypothetical line 29 extending transversely of the ring substantially intermediate its middle section 26 and the open ends thereof, as by bending the same against a cylindrical surface 30 of predetermined radius. In Fig. 4, wherein the ring 25 is shown as sprung into its housing groove 31 thereby to secure the machine part 33 against axial displacement, the upper edge portion 34 of the ring and the opposed points 35, 35' of the ring ears bear against the relatively outer wall 36 of the groove, whereas the horizontal sections 37, 37' on the opposite face of the ring bear against the abutting end face 38 of the machine part 33, the latter being positioned to overhang the relatively inner wall 40 of the groove. As with the ring 10 illustrated in Fig. 1, the internal ring 25 has pressure fit against the bottom of the groove and also acts as a leaf spring exerting endwise or axial pressure against the end face of the machine part to a degree which resiliently secures the latter against free end play. As with the shaft groove, the housing groove 31 is wider than grooves provided for conventional flat or plane rings by an amount which equals the sum total of the tolerances of the machine part 33, the thickness of the ring, and the location of the groove in the housing. Moreover, the bowing of the ring at least equals the sum total of the tolerances above enumerated so that when sprung into its groove the ring exerts axial pressure against the machine part and secures the same against free end play as caused by vibrations, for example.

As many changes could be made in carrying out the above constructions without departing from the scope of the invention, it is intended that all matter contained in the above description or shown in the accompanying drawings shall be interpreted as illustrative and not in a limiting sense.

I claim:

1. An open-ended retaining ring of the type adapted to be sprung into a circular groove provided in a shaft, housing bore or the like, and thereupon to form an artificial shoulder capable of securing a machine part against axial displacement comprising an open-ended spring ring, the section heights of which progressively diminish from its upper middle section to its open ends whereby the ring maintains circularity under deformation and is thereby enabled to pressure-fit itself against the bottom of the groove into which it is sprung throughout its full arcuate length, the ring being symmetrically bowed about a line extending transversely of the ring substantially intermediate its middle section and its open ends by a calculated amount which is at least as great as the sum total of the maximum permissible tolerances of the machine part to be secured thereby, of the thickness of the ring and of the axial location of its groove in the shaft or housing.

2. A retaining ring assembly comprising the combination of a machine part, adapted to be located on and secured against axial end play relative to another part such as a shaft, housing and the like, said other part being provided with a retaining ring groove, an open-ended spring retaining ring spring-seated in said groove and providing an artificial shoulder for locating the machine part, said groove having effective width which is greater than the thickness of the ring by an amount which is at least as great as the total of the permissible tolerances of the machine part, of the thickness of the ring, and of the axial location of groove in said other part, said machine part having its one end face disposed to overhang the relatively inner wall of the groove, and the retaining ring being sprung into the groove between said overhanging end face of the machine part and the outer wall of the groove, the ring having diminishing section height from its upper middle section to its open ends and being symmetrically bowed about a line extending transversely of the ring substantially intermediate the middle section and the open ends thereof by a calculated amount which is at least as great as said total of the permissible tolerances whereby the ring pressure-seats itself against the groove bottom throughout its full arcuate length and exerts resilient pressure in axial direction on the machine part.

3. A retaining ring assembly as set forth in claim 2, wherein said other part consists of a shaft and the like, and said groove opens outwardly thereof.

4. A retaining ring assembly as set forth in claim 2, wherein said other part consists of a housing and the like, and said groove opens inwardly to a housing bore.

HEINRICH HEIMANN.

REFERENCES CITED

The following references are of record in the file of this patent:

UNITED STATES PATENTS

| Number | Name | Date |
|---|---|---|
| 176,743 | Garth et al. | May 2, 1876 |
| 216,512 | Dalzell | June 17, 1879 |
| 454,289 | Partz | June 16, 1891 |
| Re. 18,144 | Heiermann | Aug. 4, 1931 |
| 1,875,209 | Baldwin | Aug. 30, 1932 |
| 2,322,138 | Jenny | June 15, 1943 |

FOREIGN PATENTS

| Number | Country | Date |
|---|---|---|
| 103,920 | Australia | May 6, 1938 |
| 463,684 | Germany | Aug. 1, 1928 |
| 540,229 | Germany | Jan. 29, 1931 |
| 481,970 | Great Britain | Mar. 22, 1938 |